United States Patent
Vargas et al.

(10) Patent No.: US 7,599,991 B2
(45) Date of Patent: Oct. 6, 2009

(54) RULES INTERFACE FOR IMPLEMENTING MESSAGE RULES ON A MOBILE COMPUTING DEVICE

(75) Inventors: Garrett R. Vargas, Sammamish, WA (US); Steven A. Cover, Redmond, WA (US); Gregory M. Burgess, Redmond, WA (US); Robert C. Elmer, Redmond, WA (US); Tadd H. Giles, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 10/798,743

(22) Filed: Mar. 10, 2004

(65) Prior Publication Data

US 2005/0204003 A1 Sep. 15, 2005

(51) Int. Cl.
*G06F 15/16* (2006.01)
(52) U.S. Cl. .................... 709/205; 709/206; 709/207; 719/315
(58) Field of Classification Search ............... 709/205, 709/206, 207; 719/315
See application file for complete search history.

(56) References Cited

U.S. PATENT DOCUMENTS

| | | | | |
|---|---|---|---|---|
| 5,999,932 A * | 12/1999 | Paul | ............................ | 707/10 |
| 6,134,549 A * | 10/2000 | Regnier et al. | ................. | 707/9 |
| 6,182,118 B1 * | 1/2001 | Finney et al. | ............... | 709/206 |
| 6,230,156 B1 * | 5/2001 | Hussey | ......................... | 707/10 |
| 6,654,787 B1 * | 11/2003 | Aronson et al. | ............. | 709/206 |
| 2004/0030707 A1 * | 2/2004 | Lu et al. | ..................... | 707/100 |
| 2004/0235503 A1 * | 11/2004 | Koponen et al. | ............ | 455/466 |
| 2006/0259543 A1 * | 11/2006 | Tindall | ....................... | 709/203 |

\* cited by examiner

*Primary Examiner*—William C Vaughn, Jr.
*Assistant Examiner*—Mohamed Ibrahim
(74) *Attorney, Agent, or Firm*—Workman Nydegger

(57) ABSTRACT

Described is a system and method for filtering messages received by a message-handling program, that leverage the existing message-handling architecture of computer devices to trigger events and perform other actions instead of (or in addition to) displaying the messages to users. One or more rule clients, e.g., COM objects, register for processing messages. When an appropriate message is received, the message-handling mechanism passes the message to a rule client. Depending on how that rule client responds, the message-handling mechanism determines what to do with the message, e.g., discontinue the message. Messages that are not discontinued are passed to another rule client, if any, or displayed in the user interface, if not. Rule clients may be read only, or may have write access, to modify messages. Messages may be hidden from a user by a rule client, modified before being display to a user, or left intact.

15 Claims, 5 Drawing Sheets

RULES INTERFACE FOR IMPLEMENTING MESSAGE RULES ON A MOBILE COMPUTING DEVICE

FIELD OF THE INVENTION

The invention relates generally to communicating information to computing devices, particularly on mobile computing devices including computers and mobile telephones.

BACKGROUND

Mobile computing devices such as personal digital assistants, contemporary mobile telephones, hand-held and pocket-sized computers, tablet personal computers and the like, are becoming important and popular user tools. In general, they have become small enough to be extremely convenient, while consuming less battery power, and at the same time have become capable of running more powerful applications.

Such devices are able to connect to networks, including the Internet, but also can communicate in other ways, including via Short Message Service, a standard for sending short alpha-numeric messages (maximum 160 characters) to or from mobile phones in mobile communications networks. Contemporary mobile devices such as a Pocket PC thus may present various types of information to users. Likewise, mobile telephones such as those running Microsoft Windows® Mobile software for Smartphones allow users to make conventional mobile telephone calls, send and receive SMS messages, and also access the Internet, as well as send and receive e-mails and files, store contacts, maintain appointments and do many other things contemporary computers can now do.

Information providers such as ISVs, service providers, users and programs would benefit from being able to send brief status information to a mobile device that a program (e.g., an application program or operating system component) can receive. For example, a service may want to provide stock quote updates to subscribers' mobile devices, whereby an application program could display or otherwise process the updates accordingly. An ISV may want to synchronize some data on a device with a database. Players of game programs on distinct devices may want to exchange moves with each other, with each other player's game program receiving the move data and automatically handling the move. While such communications can be accomplished via custom mechanisms, it would be more desirable to communicate the necessary information using the architecture and much of the software that is already present on the device. This would greatly reduce the amount of custom software that the information provider would need to have installed on the mobile device, while at the same time conserving resources such as memory.

SUMMARY OF THE INVENTION

Briefly, the present invention is directed towards a system and method that allows information providers to supply a rule client to process (filter) messages that are sent to an already existing message-handling program of a mobile device, such as an inbox application program. The rule client can process any message as desired, such as to intercept a message and communicate information within the message to an application program corresponding to the rule client. In this manner, incoming messages can be processed and, if desired, deleted from the inbox so that the user does not see (or otherwise detect, e.g., hear) the message. Alternatively, the message may be modified by the rule client or its corresponding application program before being presented to the user, or the message may be left in its original form.

In one implementation, SMS messages may be used to send the status information. In this implementation, SMS message handling is based on a COM (Component Object Model) interface that ISVs (independent software vendors) can implement to intercept incoming SMS messages. A rule client such as a COM object implemented as a dynamic link library (DLL) is registered for handling messages. When an appropriate message is received, the inbox application program passes the message to the registered rule client (or clients), such as by setting a special flag in conjunction with a Create Message method call. To this end, instead of directly creating the message for storage, the message storing component (e.g., the API that handles message storage) temporarily hides the message from the user and calls a registered rule client. Depending on how that rule client responds, the message storing component will determine what to do with the message. For example, messages that are not handled by the rule client are left intact, e.g., the rule client indicates that it is not interested in this message and/or that the rule client chose not to handle the message. Such a message may then be passed to another rule client, if any, until none remain. Any rule client that receives a message may indicate that it handled the message, along with an instruction as to whether other rule clients can then receive the message, or whether other rule clients should not be allowed to handle the message, that is, the message is discontinued. Messages that are handled by a rule client and indicated as being discontinued are deleted so that the user does not see the message in the inbox's user interface. Messages that are not discontinued (although possibly modified by a rule client) are stored for the user to see and process as desired.

A rule client can indicate that it only wants to see messages, not to modify them, that is, to have read-only access. For such a rule client or clients, in one implementation, a copy of the message is passed to the rule client. The copy is discarded after passing to that read-only rule client so that if the rule client did in fact make any changes (despite having designated itself as read-only), the changes are discarded with the copy. In general, any indication by a read-only client that a message is discontinued is ignored, since such an instruction would be considered as a modification, and thus not allowed.

In general, read-only rule clients receive messages before rule clients that have modify (write) privileges. Other than this ordering, in one implementation, rule clients are called in no particular order, other than an order that is based on how they are loaded. Notwithstanding, in other implementations, various types of priority mechanisms may be implemented, such as via priority flags. Statistical prioritization can also be implemented, such as to call rule clients in an order that optimizes efficiency, e.g., rule clients that frequently handle and discontinue messages may be called first to often avoid unnecessary message passing to rule clients that are frequently not interested.

Other advantages will become apparent from the following detailed description when taken in conjunction with the drawings, in which:

DETAILED DESCRIPTION

Exemplary Operating Environment

Figure 1:
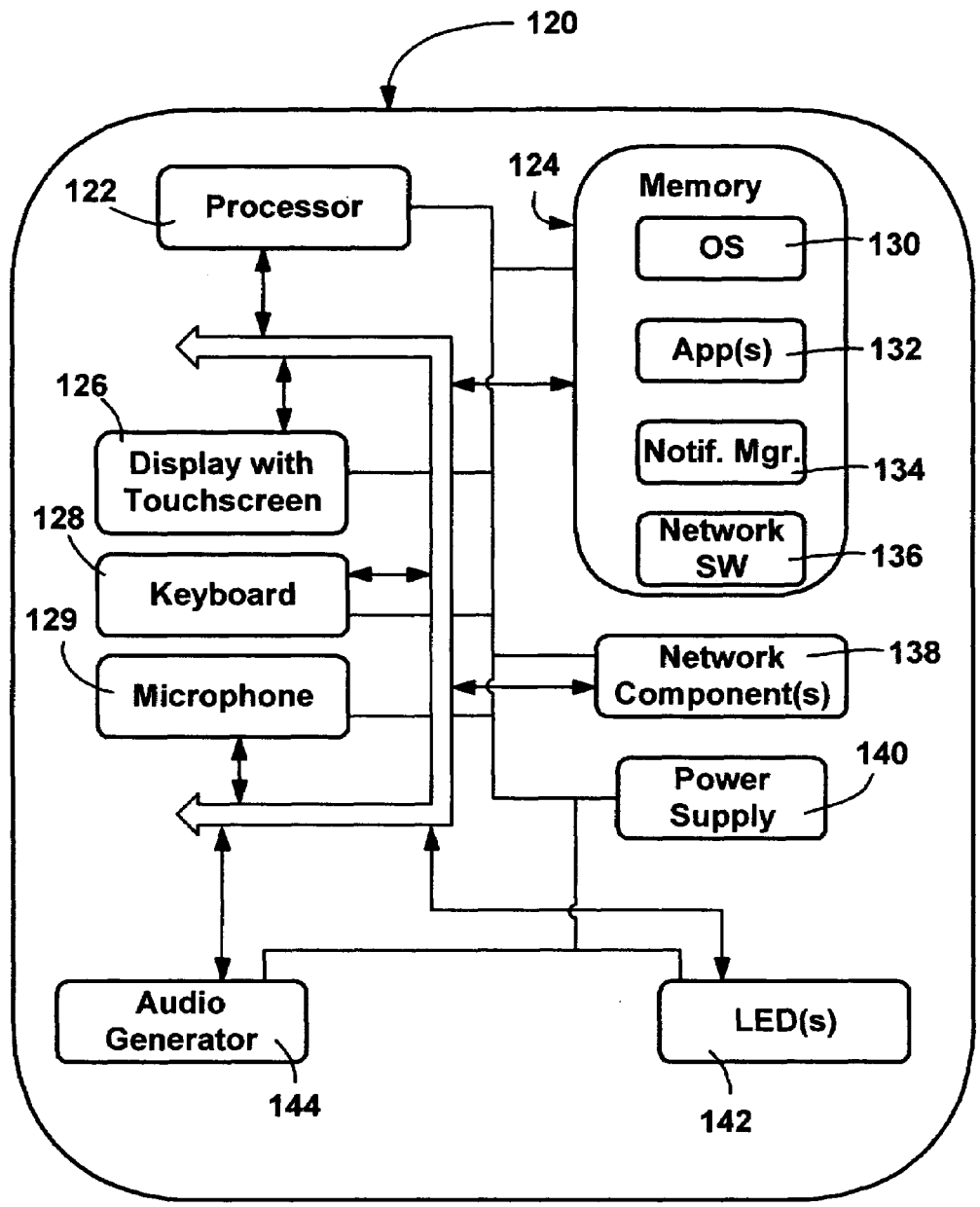
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). A microphone 129 may be present to receive audio input. The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Note that although a basic handheld personal computer has been shown, virtually any device capable of receiving data communications and processing the data in some way for use by a program, such as a mobile telephone, is equivalent for purposes of implementing the present invention.

Implementing Message Rules on a Mobile Computing Device

The present invention is generally directed towards handling messages and similar data communications, such as SMS messages, particularly on small mobile computing devices including mobile telephones. As will be understood, however, the present invention is not limited to any type of computing device, and may, for example, be used with relatively large, stationary computing devices. Moreover, although the present invention will be generally described in terms of COM objects having interfaces, and also primarily in terms of an example implementation that handles SMS messages, it will be understood that the present invention is not limited to any particular components or types of messages. In particular, as will be understood, the mechanisms described herein were specifically designed to be extensible to handle other types of messages.

Figure 2:
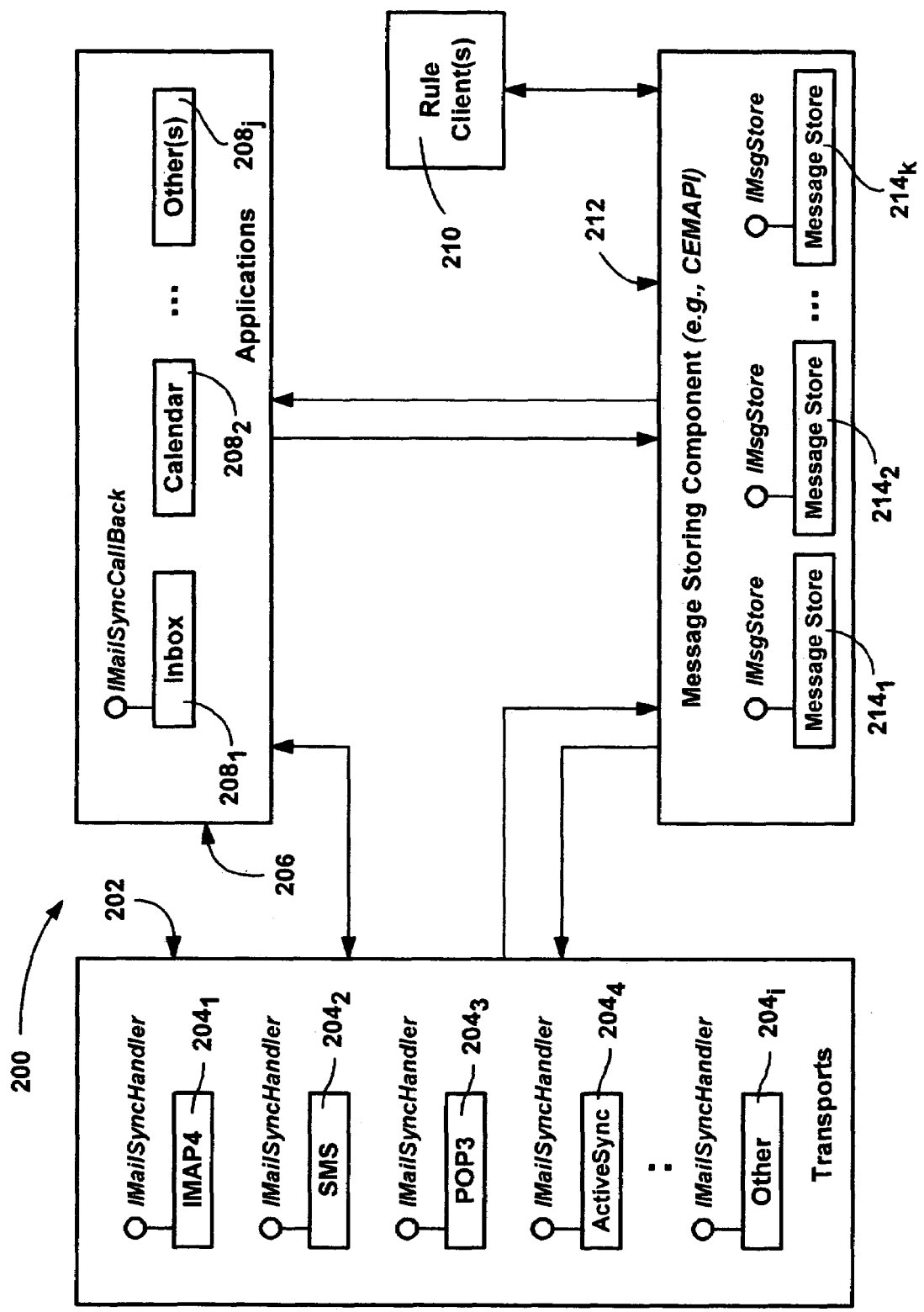
FIG. 2 is a block diagram representing a communications handling architecture into which the present invention may be incorporated.

Turning to FIG. 2, there is shown an architecture, generally designated 200, for handling mail-related messages and the like. One such architecture 200 is currently implemented in devices running Windows® Mobile software. In this example architecture, a number of transports 202 are provided, with each transport $204_1$-$204_i$ configured to receive (and transmit) different types of messages, e.g., IMAP4 (Internet Message Access Protocol version 4), SMS, POP3 (Post Office Protocol version 3), ActiveSync (which supports synchronizing data between a Windows®-based desktop computer or a Microsoft Exchange Server and Microsoft Windows® CE NET-based portable devices), and others. Such others may include IM (Instant Messaging), MMS (Multimedia Messaging Service) and the like.

In general, application programs 206 are running including applications that send and receive these communications. Such application programs may include an inbox application $208_1$, a calendar application $208_2$ and others $208_j$. In accordance with an aspect of the present invention and as described below with reference to FIGS. 3-5, one or more of these other applications $208_j$ may be configured to receive special communications that are, for example, initially received at the inbox application $208_1$ but are then redirected (or otherwise have corresponding data sent) to the other application by a corresponding rule client 210. Note that another such program that can receive data from a rule client is an operating system component, and as such, any such computer program code should be considered equivalent for purposes of the present invention.

A message storing component 212 (e.g., CEMAPI) such as implemented in an API allows the inbox application $208_1$ to store messages as desired. Note that in one implementation, a unique message store $214_1$-$214_k$ is associated with each Inbox service, and the message storing component 212 provides access to these message stores via an IMsgStore interface. In this implementation, the message store libraries provide the IMsgStore interface, which provides access to unique, transport-specific storage. For example, the Inbox may store SMS messages in one message store, IMAP4 messages in another, and so on. The IMsgStore::GetProps and IMsgStore::SetProps methods accessed through each messages store's IMsgStore interface are used to access custom properties of the store.

In accordance with an aspect of the present invention, rather than directly storing a received message for subsequent user handling, the inbox instructs the message storing component 212 to give any rule client (or clients) 210 an opportunity to process the message. Note that rule clients are not loaded until the first message that signals that it should be processed by one or more rule clients (via a special flag to CreateMessage) is received. This way, clients of the message storing component 212 that do not load transports do not load rule clients (as in this implementation, only transports should be using this special flag). This has the effect of only loading rule clients in the inbox application's process space, thus avoiding the need for special-case logic in the message storing component 212 in order to determine which application is loading it.

As described below, a rule client may ignore a message, handle the message and leave it intact, handle the message and modify it in some way, or handle the message and discontinue (delete) it. In general, unless discontinued by a rule client, the message storing component 212 will pass the message to each rule client until no rule clients remain. If not discontinued, the message is stored, which may be in a modified form.

Figure 3:
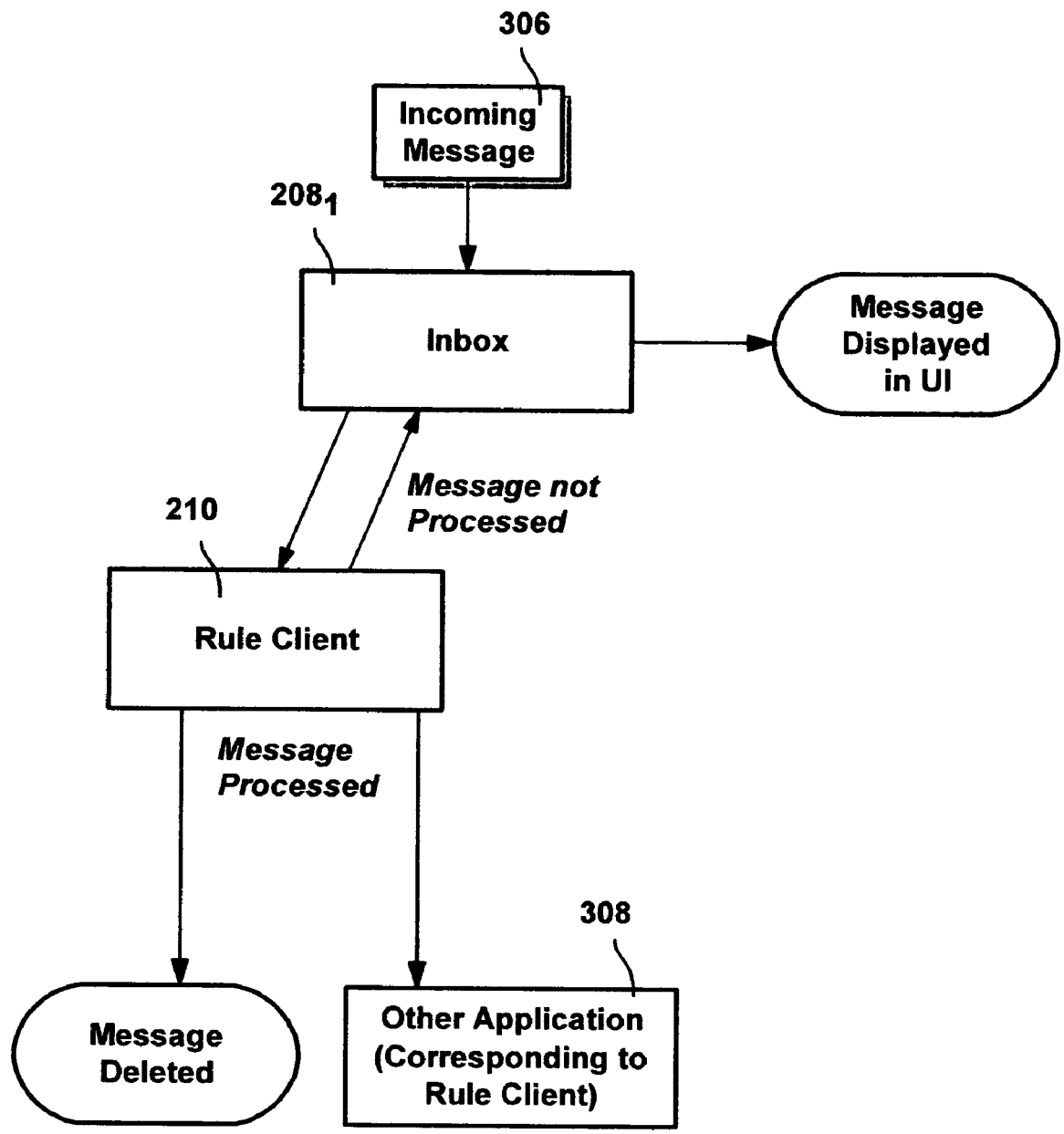
FIG. 3 is a general representation of how general message handling may take place in a rule client to process and delete a message or display that message, in accordance with an aspect of the present invention.

FIG. 3 shows the basic flow of messages when a simple status notification or the like needs to be sent upon receipt of a particular type of message. In this common scenario, a certain other application program wants the notification, but a typical user does not want to see such a message or even know that it was received. The user wants to see other messages, however, as normal. To this end, when CreateMessage is called, the special flag is passed which causes the message storing component 212 to create the message in a special hidden folder that the user does not normally see. Note that the message is created and stored, but in a different place than usual. The code that called CreateMessage then typically sets different properties on the message (from, subject, time, and so forth) by calling the SetProps method on a message pointer that CreateMessage returned. The message storing component 212 delays running the rule clients until SetProps is called with a special property that indicates that all relevant properties have been set on the message. Note that if the rule clients were instead processed in response to CreateMessage, there would not be any useful information in the message at that time.

In general, the inbox application program 208$_1$ (along with the message storing component 212 as described below) passes a received message 306 to a rule client 210, which either decides to process the message, such as by providing information in the message to a corresponding application program 308, or return it unprocessed. Processed messages are deleted, while unprocessed messages are saved for displaying in the user interface of the inbox program. Note that as described below, more complex message handling operations may be performed, instead of simply passing a message to a rule client for processing/deletion or displaying if not processed as in FIG. 3.

Figure 4:
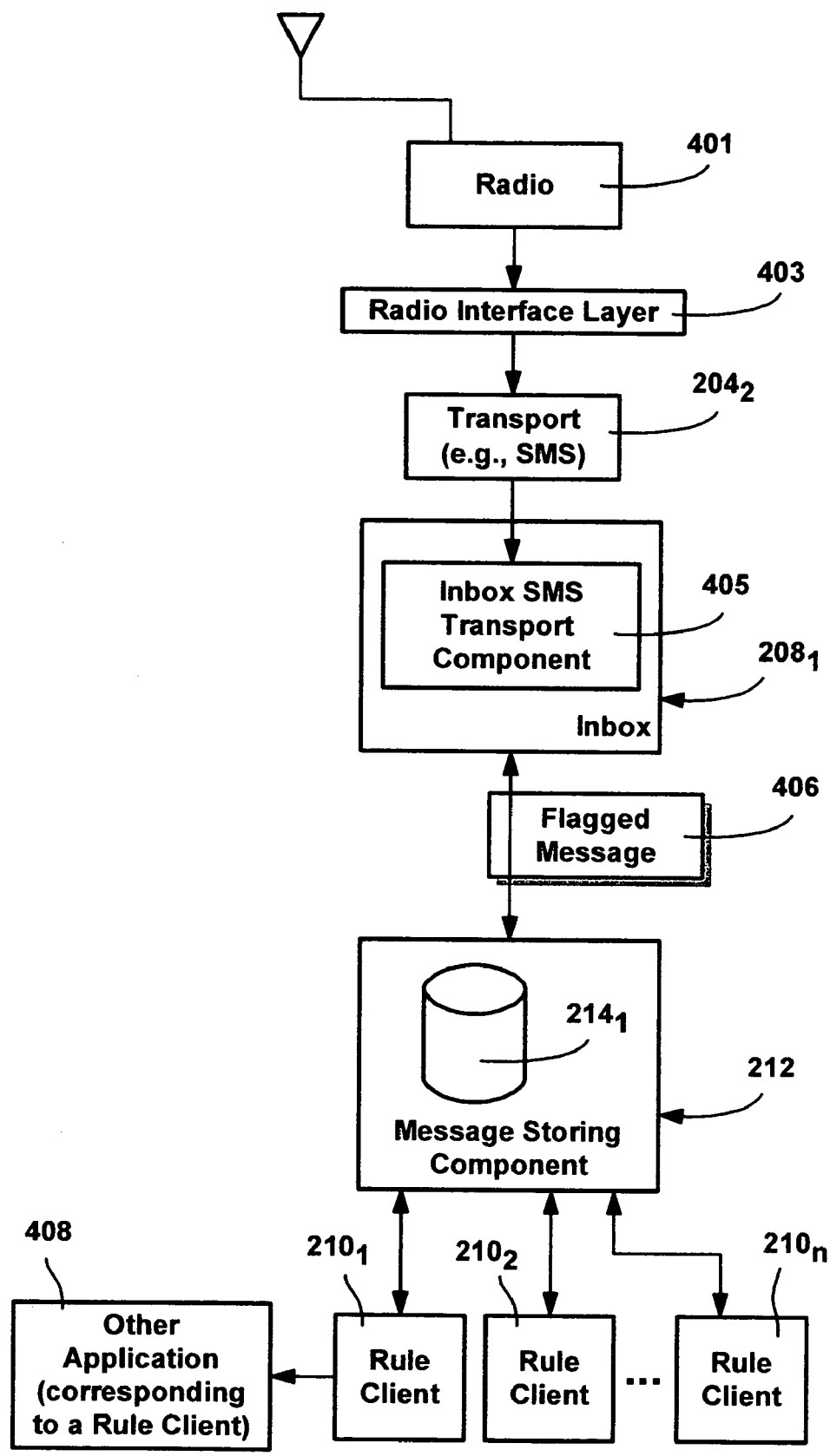
FIG. 4 is a block diagram representing the flow of a message through various components towards a set of rule clients, in accordance with an aspect of the present invention.

FIG. 4 represents message handling components, for handling a message such as an SMS message being received at a radio 401 of the mobile device. A radio interface layer 403 passes the received message to the appropriate transport, e.g., the SMS transport 204$_2$ for this particular SMS message. The SMS transport 204$_2$ launches the inbox program 208$_1$ which loads its internal SMS transport component 405 which receives then handles the message.

In accordance with an aspect of the present invention, instead of instructing the message storing component 212 to store the message, (e.g., by calling a create message method of the message storing component 212), the message 406 is first flagged as being special, that is, marked so as to be processed by any rule clients. Note that this flag gives the inbox program 208$_1$ the ability to decide which types of messages are to be sent to the rule clients, and which are not, e.g., SMS and IMAP4 messages might be flagged for sending to rule clients, whereas other messages are not.

When the message storing component 212 receives the message, e.g., in a create message method call, the message storing component 212 detects the flag and knows to call any rule clients that have registered for message handling. As described below, depending on what each called rule client does with the message, the message storing component 212 may store or delete the message. It should be noted that rather than flagging the message and having the message storing component call the rule clients, it is essentially equivalent to have an alternative implementation in which the inbox program calls the rule clients and then decides from each called rule client's response whether call the message storing component for storage. Indeed, rule client developers and program developers can essentially think of the general operation as being that the inbox program calls the rule client. Notwithstanding, one benefit to having the message storing component couple with the rule clients is that the rule clients are then independent of any particular application program, whereby other application programs and/or versions can use the rule client filtering mechanism of the present invention simply by setting the flag when appropriate. As used herein, the term "message-handling mechanism" will be used to refer to the inbox application or the like and/or the message storing component, and may also include the concept of a transport, where appropriate.

In any event, a rule client is called and given an opportunity to process the message. For example, the rule client 210$_1$ may extract information from the message (which may be the entire message) and pass that information to a corresponding application program 410, as represented in FIG. 4. The rule client then returns from the call (the one received from the message storing component 212) with status information, including whether to let other rule clients handle the message or whether to discontinue the message. If not discontinued, the message storing component 212 will call the next rule client 210$_2$ and so on, until the message is discontinued or no rule clients remain. If the message has not been discontinued and no rule clients remain to call, the message is stored.

To facilitate the calling, as described above, in one implementation, each rule client is a COM object that implements the following interface:

```
// {96D2552D-B83B-4b48-8E89-DCC26512DBA4}
static const GUID IID_IMailRuleClient =
{ 0x96d2552d, 0xb83b, 0x4b48, { 0x8e, 0x89, 0xdc, 0xc2, 0x65,
0x12, 0xdb, 0xa4 } };
typedef enum _MRCACCESS
{
    MRC_ACCESS_NONE = 0,            // Client isn't
                                    interested in this
                                    message
    MRC_ACCESS_READ_ONLY = 1,       // Client is only
                                    interested in read
                                    access
                                    // for messages
    MRC_ACCESS_WRITE = 2            // Client wants write
                                    access for messages
} MRCACCESS;
typedef enum _MRCHANDLED {
    MRC_NOT_HANDLED = 0,            // Client didn't
                                    handle the message
    MRC_HANDLED_CONTINUE = 1,       // Client handled
                                    message, let others
                                    // handle too
```

-continued

```
    MRC_HANDLED_DONTCONTINUE = 2    // Client handled
                                     message, don't let
                                     others
                                     // handle
} MRCHANDLED;
interface IMailRuleClient : public IUnknown
{
public:
    MAPIMETHOD (Initialize) (
        IMsgStore   *pMsgStore,
        MRCACCESS *pmaDesired
        ) _PURE;
    MAPIMETHOD (ProcessMessage) (
        IMsgStore *pMsgStore,
        ULONG cbMsg,
        LPENTRYID lpMsg,
        ULONG cbDestFolder,
        LPENTRYID lpDestFolder,
        ULONG *pulEventType,
        MRCHANDLED *pHandled
        ) _PURE;
};
```

As seen via this interface, the rule client can return information indicating that it chose not to handle the message, or that it handled the message but will let any subsequent other rule client or clients handle it as well. As a third choice, the rule client can discontinue the message such that no other rule client receives it, and it will not be stored. Note that it is possible for a rule client to persist a message or some part thereof for its own subsequent use, such as to wait for its corresponding application program to be run.

As part of handling the message, the rule client may modify it in some way. By way of example, consider a chess game being played by a user of a remote device. Data representing a chess move can be received by a rules client, which can, for example, recognize a program identifier or the like sent within the message so that it knows to process that particular message. The rules client can pass the move data to its corresponding application (chess game) program, which can update a displayed the chessboard with the move, and possibly maintaining some information as to what move occurred so that the user can later tell what occurred. Rather than delete the message or save the message as is, the rules client can modify the message to something such as, "See chess program, your opponent moved and it is now your turn."

As seen from the above interface, a rule client can, when initialized, specify that it is to have read only access to messages, in which case it can receive but cannot modify messages, or specify write access, in which case it can modify (and delete) messages. In one implementation, before passing a message to a read-only rule client, a copy of the original message is made and passed instead. The copy is then discarded following processing by that rule client. In this manner, any modifications made to the message are simply discarded. Note that if another enforcement mechanism is available in a given system to control the type of access granted to received messages, that enforcement mechanism can instead be used.

Moreover, it can be readily appreciated that the present invention can also handle filtering operations at other levels. For example, the interface on the message storing component 212 may be easily extended so that rule clients can specify a restriction or restrictions, such as at the time of initialization, or thereafter (such as upon learning about certain messages that the rule client does not want to see). This allows the message storing component 212 to do at least some of the work in determining whether a message is actually intended for a given rule client or not, which can provide efficiency benefits. For example, in one implementation, rule clients are implemented as different processes, and thus by performing such pre-filtering in the message storing component 212, processes need not be created and/or communications not exchanged with a given rule client if the message does not pass that rule client's specified restriction or restrictions.

Figure 5:
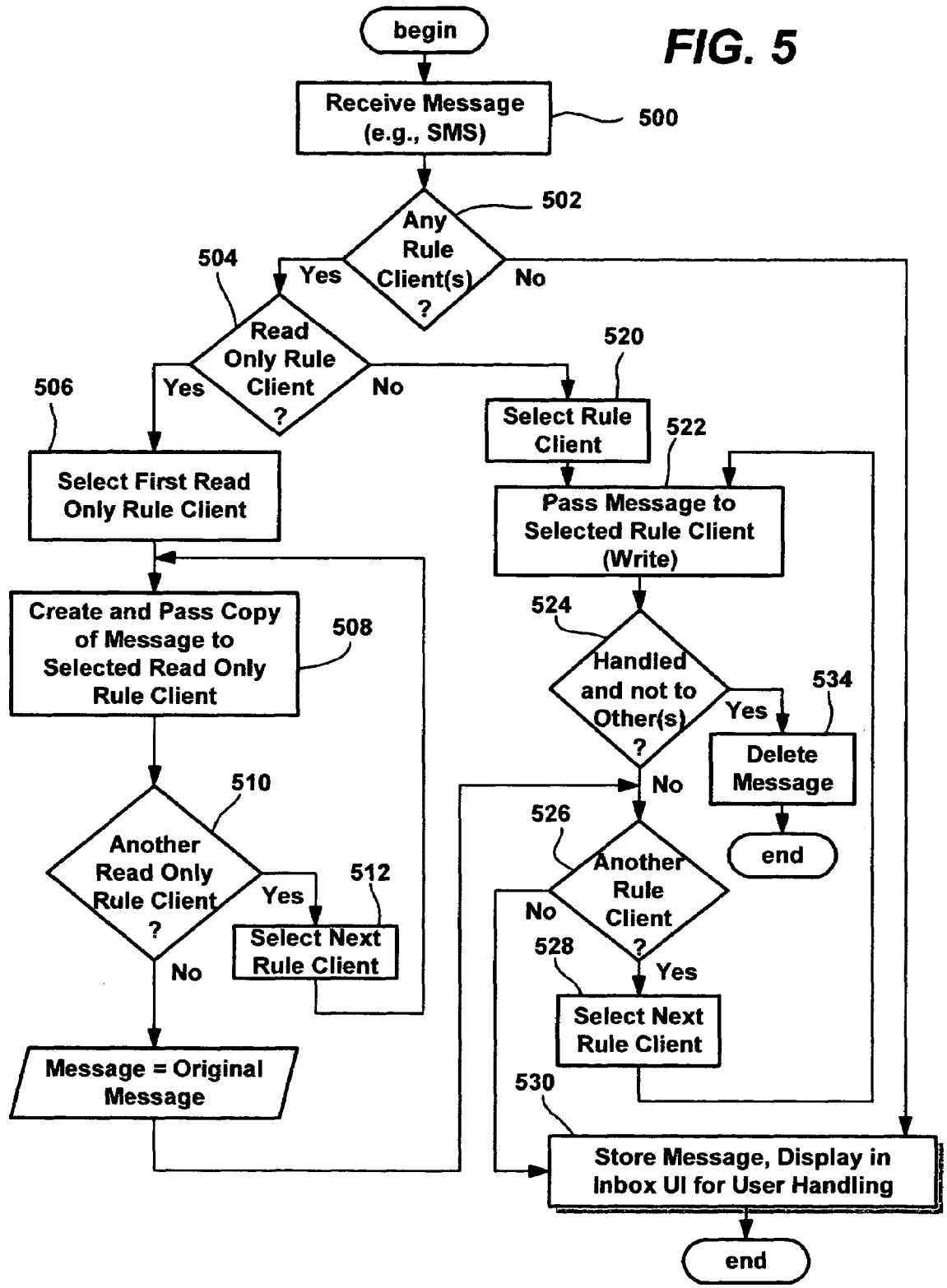
FIG. 5 is a flow diagram representing a more detailed way in which a message may be processed by one or more rule clients and the result of that processing in one example implementation, in accordance with an aspect of the present invention.

Turning to an explanation of how a message is handled, FIG. 5 shows some example logic that the inbox program $208_1$/client message storing component 212 can use to handle messages in accordance with various aspects of the present invention. Step 500 represents a message being received, and step 502 represents checking whether any rule clients are connected for message processing. If not, step 502 branches to step 530 to store the message for display in the user interface of the inbox for the user to process, and the process ends.

In accordance with an aspect of the present invention, if at least one rule client is loaded, step 502 branches to step 504 to pass the message to the rule client or clients. In general, there is no guaranteed order of execution when there are multiple rules clients loaded to process messages. However, in one implementation, read-only clients are allowed to see messages first, because they will not change that message. Alternative priority schemes may be implemented, such as by having a rule client provide a priority level upon initialization. Further, statistics may be kept to improve efficiency, e.g., a stock quote-related rule client may get an update message every few minutes and discontinue the message from other rule clients, whereas a chess program-related rule client may receive messages relatively infrequently. Statistics can track this so that the stock quote-related rule client receives messages before the chess program-related rule client so that unnecessary message handling is avoided for the more frequent message.

Returning to the example implementation of FIG. 5 in which read-only clients are provided with a message first, step 504 determines whether there is at least one read-only rule client. If not, step 504 branches to step 520, as described below. Otherwise, step 504 branches to step 506 to select the first read-only client for message processing. As described above, in one implementation read-only rule clients receive a copy of the message rather than the original, which is represented in FIG. 5 via step 508.

Note that read-only clients cannot modify a message, which also (as is common to the concept of read-only) prevents them from deleting the message. If however a read-only client is prevented from modifying the content of a message, but still allowed to delete it entirely, another step (not shown) following step 508 could be provided to detect such a condition, in which case the message would be deleted and the process ended.

Step 510 tests whether another read-only rule client is available to handle the message. If so, that next rule client is selected at step 512 and the process returns to step 508. Note that in this example implementation, a new copy of the original is made so that any changes made by a prior read-only rule client are not seen by subsequent rule clients. When no more rule clients remain as detected at step 510, the process continues to step 526 to see if there is at least one other (write access) rule client. Note that the message is "restored" to the original message, that is, the latest copy is discarded and the original message will now be used by any subsequent (write access) rule client.

At step 526 if there is not another (write access) rule client, the process continues to step 530, to store the message for display in the user interface of the inbox for the user to process, and the process ends.

If instead at step 526 at least one other rule client exists, the next rule client (which is a write-access rule client in this implementation) is selected at step 528, and the message passed to that rule client at step 522. The first such write-access rule client receives the original message that was received at the inbox. After processing, the return information is checked to determine whether the client did not handle the message, handled it but will allow others to see it, or handled the message but wants to discontinue the message, that is delete it before any other rule client can process it. If at step 524 the rule client handled the message and does not want other rule clients to receive it, the message is deleted at step 534 and the process ends. Otherwise the process continues to step 526, which via step 528 selects the next rule client and repeats the process if at least one other rule client remains, although it should be noted that the message that is sent to the next rule client may be modified by the previous rule client. Otherwise step 526 ends the process when no rule clients (that have not already processed the message) remain. Note that step 530 stores the message for user handling as described above, however it should be noted that once step 522 has been executed, the message that is saved may be modified relative to the original message.

As can be readily appreciated, other states are feasible to implement if desired. For example, a state such as "let other rule clients see the message but delete it before storing" is feasible, such as by checking for such a delete-before-storing state between step 526 and step 530.

In this manner, rule clients are provided with the opportunity to review, process, modify and/or delete messages and take some action based thereon, generally in conjunction with an application program. The filtering mechanism facilitated by the rule clients of the present invention thus provides a straightforward way in which to send messages to a computing device that are directed towards an application program rather than a user, while leveraging the already-present architecture and much of the software that handles message receipt. Such messages may be hidden from the user as desired.

It should be noted that IMAP4-based messages that a rule client instructs should be deleted may not be entirely hidden from a user, because IMAP4 messages contain both a header and a body which are separately processed in two phases. Generally a fast thread handles the header processing phase and puts some information from the header into the UI for display, while a slower thread collects the body of the message in a second phase and adds it to the user interface at some later time. In an implementation in which the header provides no information that it is a message intended for a rule client, the header information will appear in the user interface as normal, rather than waiting for the body of the message to be received, so as to not delay display for conventional messages (in a pre-process). The displayed header information will be deleted if a rule client later decides (in a post-process once the message body is available) that the message should be deleted. If data can be added to the header of such a message to indicate that the message is intended for a rule client, such data can be detected so that the header information is not displayed unless and until the rule clients have fully processed the entire message. The transport can tell the message storing mechanism 212 when to show message information versus pass the message to the rule client or clients.

The following provides some additional information about rule clients in one implementation, including that to be loaded, the DLL for the rule client needs to be registered in the registry as a COM object. To respond to these changes in the registry, the inbox application program needs to be restarted after the registry has been updated. In this implementation, a rule client supports the Initialize and ProcessMessage methods of IMailRuleClient. When the system receives a message, it searches the registry for rule clients registered for the transport on which the message arrived, e.g., the SMS transport, and extracts the DLL name from the registry setting. If the message is the first message on this transport, the Initialize method on the IMailRuleClient of the DLL is called. After initialization, the ProcessMessage method is called to apply rules to every message that arrives on this transport.

IMailRuleClient

The IMailRuleClient interface allows implementation of a mail rule client that can process (filter) incoming messages. Processed messages can be moved, modified, or deleted by the client.

Methods in Vtable Order:
    IUnknown Methods

| IMailRuleClient methods | Description |
| --- | --- |
| Initialize | Initializes the mail rule client. |
| ProcessMessage | Processes incoming messages, which can be moved, modified, or deleted. |

Remarks

A mail rule client, in addition to registering as a COM object, adds the following item to the registry:

```
[HKEY_LOCAL_MACHINE\Software\Microsoft\Inbox\Svc\
<TransportName>\Rules]
    <CLSID> = dword: 1
```

Replace <CLSID> with the class identifier (CLSID) of the mail rule client, and <TransportName> with the transport name for which the rule client is registering. When the inbox application starts, it calls Initialize for every transport that is associated with <TransportName>.

IMailRuleClient::Initialize

The Initialize method determines how the mail rule client will process incoming messages:

Syntax

```
HRESULT Initialize  (
    IMsgStore   *  pMsgStore,
    MRCACCESS * pmaDesired
);
```

Parameters
  pMsgStore
  [in] Reference to IMsgStore, representing the message store that contains the incoming messages.
  pmaDesired
  [out] The type of access that the mail rule client requests for processing the incoming messages, described by the MRCACCESS enumeration. The access is per store, as opposed to per transport.

Return Values

This method should return S_OK if the mail rule client was

IMailRuleClient::ProcessMessage

The ProcessMessage method processes incoming messages, which can be moved, modified, or deleted.

Syntax

```
HRESULT ProcessMessage (
    IMsgStore * pMsgStore,
    ULONG cbMsg,
    LPENTRYID lpMsg,
    ULONG cbDestFolder,
    LPENTRYID lpDestFolder,
    ULONG * pulEventType,
    MRCHANDLED * pHandled
);
```

Parameters pMsgStore

[in] Reference to IMsgStore, representing the message store that contains the incoming messages.

cbMsg

[in] The size of lpMsg in bytes.

lpMsg

[in] The ENTRYID of the message.

cbDestFolder

[in] The size of lpDestFolder in bytes.

lpDestFolder

[in] The ENTRYID of the folder that incoming messages are moved to.

pulEventType

[out] A combination of fnev bit flags that indicates the type of action that the client performed on the message. This flag is set by the client so the transport can properly handle the message if it has changed.

pHandled

[out] The type of message handling that occurred during the processing, described by the MRCHANDLED enumeration.

Return Values

This method should return S_OK if the processing was successful, and appropriate errors if not.

Remarks

The following table describes the bit flags that can be used in the *pulEventType parameter. They are defined in the mapidefs.h header file.

| Flag | Value | Description |
| --- | --- | --- |
| fnevObjectCreated | 0x00000004 | The client created the message. |
| fnevObjectDeleted | 0x00000008 | The client deleted the message. |
| fnevObjectModified | 0x00000010 | The client modified the message. |
| fnevObjectMoved | 0x00000020 | The client moved the message. |
| fnevObjectCopied | 0x00000040 | The client copied the message. |

Registering Custom Rules Clients

A rules client needs to be registered with the inbox application so that the inbox application can pass messages to these clients. This registration requires two registry settings: one to register the DLL with the Component Object Model (COM) subsystem, and one to register the client with the inbox application. The Inbox application needs to be restarted to respond to these changes in the registry.

Registry settings to register the rules client's globally unique identifier (GUID) with COM:

```
[HKEY_CLASSES_ROOT\CLSID\{GUID}\InProcServer32]
    = REG_SZ: The name of the DLL to process rules.
    {GUID} represents the globally unique identifier of the
    rules client.
```

Registry settings to register the rules client with Inbox

```
[HKEY_LOCAL_MACHINE\Software\Microsoft\Inbox\Svc\SMS\Rules]
    "{GUID}" = REG_DWORD: 1
    {GUID} is the GUID that was used to register the rules
client with COM.
```

An example for a custom rules client to process SMS messages

```
; Register the GUID with COM.
[HKEY_CLASSES_ROOT\CLSID\{28A42C00-1255-4dc7-9E0A-
FA2F77EFB694}\InProcServer32]
    = "TicTacToe.dll"
; Set up SMS rules for SMS forms that use this rules client.
[HKEY_LOCAL_MACHINE\Software\Microsoft\Inbox\Svc\SMS\Rules]
    "{28A42C00-1255-4dc7-9E0A-FA2F77EFB694}" =
    REG_DWORD:1
```

As can be seen from the foregoing detailed description, there is provided a method and system for filtering incoming messages via a rule client method and system. The rule clients allow information to be communicated using the architecture and much of the message processing software that is already present on the device. The present invention thus provides numerous advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a mobile computing device, a method for filtering messages received by an inbox program to route selected messages to applications rather than directly to a message inbox, the method comprising:

receiving a message at an inbox program that is configured to present message data to users, the inbox program including a message storing component, the inbox program being installed on the mobile computing device;

upon detecting that the message should be sent to a plurality of rule clients, flagging the message at the inbox program, indicating that the message should be sent to the plurality of rule clients that have registered to receive messages that have been flagged, wherein the plurality of rule clients includes at least one rule client that requests read only access to received messages and at least one rule client that requests write access to received messages, and wherein the plurality of rule clients registers by registering a dynamic-link library in a system registry as a component object model object such that each rule client is loaded when the inbox program receives the message, each rule client being loaded in the inbox program's process space;

calling a create message function and passing the flagged message to the message storing component;

upon the message storing component detecting the flag, the message storing component calling a first rule client of the plurality of rule clients and providing a copy of the message to the first rule client rather than storing the message in the message inbox, wherein the first rule client is registered to receive read only access to the message;

the first rule client processing the copy of the message such that the first rule client extracts information from the copy of the message and passes the information to an application program that is distinct from the inbox program;

upon detecting that the first rule client is finished processing the copy of the message, discarding the copy of the message;

after the first rule client has processed the copy of the message, providing the message to a second rule client that is registered to receive write access to the message; and receiving data from the second rule client, the data indicating whether the inbox program may provide the message to the next rule client in the plurality of rule clients or discard the message.

2. The method of claim 1 wherein receiving a message comprises receiving a message in an SMS format.

3. The method of claim 1 wherein receiving a message comprises receiving a message formatted according to a protocol, the protocol belonging to a set containing IMAP4, POP3, ActiveSync, Instant Messaging and MMS.

4. The method of claim 1 wherein calling the first rule client and providing the copy of the message comprises calling the first rule client on a defined interface.

5. The method of claim 1 further comprising, upon determining that the data received from the second rule client indicates that the message should be discarded, the inbox program deleting the message.

6. The method of claim 1 further comprising, upon determining that the data received from the second rule client indicates that the message may be provided to the next rule client, determining whether there is a next rule client in the plurality of rule clients, and if so providing the message to the next rule client.

7. The method of claim 6 further comprising, upon determining that there is no next rule client in the plurality of rule clients, storing the message for display in a user interface corresponding to the inbox program.

8. The method of claim 6 wherein the data received from the second rule client indicating that the inbox program may provide the message to the next rule client comprises information indicating that the second rule client was not interested in processing the message.

9. The method of claim 6 wherein the data received from the second rule client indicating that the inbox program may provide the message to the next rule client comprises information indicating that the second rule client processed the message.

10. Memory having stored thereon computer-executable instructions which when executed perform the method of claim 1.

11. The method of claim 1 further comprising, the second rule client modifying the message.

12. The method of claim 1 wherein each of the rule clients of the plurality of rule clients is ordered such that rule clients requesting read-only access to messages are called prior to rule clients requesting write access to the messages.

13. In a computing device, a system for filtering messages received by an inbox program to route selected messages to applications rather than directly to a message inbox, the system comprising:

a processor; and memory storing instructions which when executed by the processor perform a method comprising:

receiving a message at an inbox program that is configured to present message data to users, the inbox program including a message storing component, the message being received over a Short Message Service (SMS) transport;

upon receiving the message, searching a system registry for rule clients that have registered to receive messages that are received over the SMS transport, wherein each rule client registers in the system registry by adding a name of a dynamic-link library (DLL) which defines the rule client to an entry corresponding to the SMS transport in the system registry;

upon detecting that a plurality of rule clients are registered to receive messages that are received over the SMS transport, flagging the message at the inbox program, indicating that the message should be sent to the plurality of rule clients, wherein the plurality of rule clients includes at least one rule client that requests read only access to received messages and at least one rule client that requests write access to received messages, calling a create message function and passing the flagged message to the message storing component;

upon the message storing component detecting the flag, the message storing component calling a first rule client of the plurality of rule clients and providing a copy of the message to the first rule client rather than storing the message in the message inbox, wherein the first rule client is registered to receive read only access to the message;

the first rule client processing the copy of the message such that the first rule client extracts information from the copy of the message and passes the information to an application program that is distinct from the inbox program;

upon detecting that the first rule client is finished processing the copy of the message, discarding the copy of the message;

after the first rule client has processed the copy of the message, providing the message to a second rule client that is registered to receive write access to the message; and receiving data from the second rule client, the data indicating whether the inbox program may provide the message to the next rule client in the plurality of rule clients or discard the message.

14. The system of claim 13 further comprising, upon receiving the data from the second rule client indicating that the inbox program may provide the message to the next rule client, the inbox program storing the message in a message inbox.

15. The system of claim 13 wherein the data returned from the second rule client indicates that the second rule client was not interested in handling the message.

* * * * *

UNITED STATES PATENT AND TRADEMARK OFFICE
CERTIFICATE OF CORRECTION

PATENT NO.        : 7,599,991 B2                           Page 1 of 1
APPLICATION NO.   : 10/798743
DATED             : October 6, 2009
INVENTOR(S)       : Garrett R. Vargas et al.

It is certified that error appears in the above-identified patent and that said Letters Patent is hereby corrected as shown below:

In column 13, lines 10-11, in Claim 1, delete "registers" and insert -- register --, therefor.

Signed and Sealed this
Eighth Day of February, 2011

David J. Kappos
*Director of the United States Patent and Trademark Office*